US012663734B2

(12) United States Patent
Sano et al.

(10) Patent No.: US 12,663,734 B2
(45) Date of Patent: Jun. 23, 2026

(54) TONER

(71) Applicant: CANON KABUSHIKI KAISHA, Tokyo (JP)

(72) Inventors: Tomohisa Sano, Shizuoka (JP); Kazuyuki Sato, Kanagawa (JP); Tohru Hiramatsu, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 760 days.

(21) Appl. No.: 17/808,807

(22) Filed: Jun. 24, 2022

(65) Prior Publication Data

US 2023/0014130 A1 Jan. 19, 2023

(30) Foreign Application Priority Data

Jul. 2, 2021 (JP) ................................ 2021-110925

(51) Int. Cl.

*G03G 9/097* (2006.01)
*G03G 9/08* (2006.01)
*G03G 9/087* (2006.01)

(52) U.S. Cl.

CPC ....... *G03G 9/09733* (2013.01); *G03G 9/0819* (2013.01); *G03G 9/08711* (2013.01); *G03G 9/09725* (2013.01)

(58) Field of Classification Search

CPC ............. G03G 9/09733; G03G 9/0819; G03G 9/08711; G03G 9/09725; G03G 9/093

See application file for complete search history.

(56) References Cited

U.S. PATENT DOCUMENTS 5,449,583 A 9/1995 Murofushi et al.
5,660,959 A * 8/1997 Moriyama et al. .......................... G03G 9/09725
7,123,862 B2 10/2006 Hasegawa
7,582,401 B2 9/2009 Ogawa
7,678,523 B2 3/2010 Hiroko
7,678,524 B2 3/2010 Hasegawa
7,811,734 B2 10/2010 Ogawa
7,923,190 B2 4/2011 Magome
7,935,467 B2 5/2011 Dojo
8,227,162 B2 7/2012 Sano
8,426,091 B2 4/2013 Magome
8,426,094 B2 4/2013 Magome
8,518,620 B2 8/2013 Dojo
(Continued)

FOREIGN PATENT DOCUMENTS

CN 104106007 A 10/2014
CN 106842842 A 6/2017
(Continued)

OTHER PUBLICATIONS

Machine translation of JP 2020-091327, Kobori (Year: 2025).*
(Continued)

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a binder resin, a crystalline material, and a silica particle, wherein a number average particle diameter D1 of the silica particle comprised in the toner particle is 400 to 3000 nm; the silica particle has a pointed portion; and the crystalline material comprises a compound having an ester group.

12 Claims, 1 Drawing Sheet

(56) References Cited

U.S. PATENT DOCUMENTS 8,614,044 B2 12/2013 Matsui
8,778,585 B2 7/2014 Matsui
8,841,054 B2 9/2014 Dojo
8,918,035 B2 12/2014 Hasegawa
9,029,055 B2 5/2015 Aoki
9,152,065 B2 10/2015 Sano
9,213,250 B2 12/2015 Nomura
9,235,151 B2 1/2016 Tanaka
9,239,528 B2 1/2016 Hasegawa
9,244,371 B2 1/2016 Suzumura
9,377,708 B2 6/2016 Magome
9,417,542 B2 8/2016 Hiroko
9,423,711 B2 8/2016 Uratani et al.
9,551,947 B2 1/2017 Hiroko
9,625,841 B2 4/2017 Hiroko
9,658,549 B2 5/2017 Tanaka
9,804,514 B2 10/2017 Suzumura
9,804,519 B2 10/2017 Suzumura
9,841,692 B2 12/2017 Hasegawa
9,880,478 B2 1/2018 Shimano
9,927,728 B2 3/2018 Arimura
9,946,179 B2 4/2018 Arimura
9,946,181 B2 4/2018 Hasegawa
9,964,874 B2 5/2018 Suzumura
9,964,881 B2 5/2018 Ikejiri
9,971,262 B2 5/2018 Hasegawa
9,971,263 B2 5/2018 Fukudome
9,971,264 B2 5/2018 Sano
10,012,923 B2 7/2018 Sano
10,151,990 B2 12/2018 Suzuki
10,228,627 B2 3/2019 Nagashima
10,295,920 B2 5/2019 Nishikawa
10,303,075 B2 5/2019 Tanaka
10,310,397 B2 6/2019 Sano
10,545,420 B2 1/2020 Kinumatsu
10,698,327 B2 6/2020 Nagashima
10,747,136 B2 8/2020 Kenmoku
11,079,695 B2 8/2021 Sato
11,099,493 B2 8/2021 Komiya
11,181,839 B2 11/2021 Yamashita
11,181,840 B2 11/2021 Nagata
11,181,844 B2 11/2021 Nagaoka
11,181,846 B2 11/2021 Kinumatsu
11,333,989 B2 5/2022 Unno
2002/0055052 A1 5/2002 Komoto et al.
2005/0209364 A1 9/2005 Yamagishi
2006/0121379 A1 6/2006 Dojo
2008/0124643 A1* 5/2008 Yoshiba et al. ........ G03G 9/093
2008/0187856 A1 8/2008 Broce et al.
2009/0197192 A1 8/2009 Hiroko
2011/0229812 A1* 9/2011 Takahashi et al. ...... G03G 9/00
2012/0107741 A1 5/2012 Hiraoka et al.
2012/0301160 A1 11/2012 Shu
2014/0147785 A1* 5/2014 Matsushita et al. ... G03G 9/093
2016/0266507 A1 9/2016 Watanabe et al.
2016/0378003 A1 12/2016 Arimura
2018/0059561 A1* 3/2018 Nakashima et al. ... G03G 9/087
2018/0329321 A1 11/2018 Nakamura et al.
2020/0117107 A1 4/2020 Tsujihiro
2020/0209771 A1 7/2020 Hashimoto et al.
2020/0285161 A1 9/2020 Takatsuna
2021/0080846 A1 3/2021 Mizuguchi
2021/0356878 A1 11/2021 Mizuguchi
2022/0026822 A1 1/2022 Sato
2022/0026823 A1 1/2022 Sano
2022/0146952 A1 5/2022 Komiya
2022/0146955 A1 5/2022 Nozaki
2022/0171301 A1 6/2022 Suzumura
2022/0171302 A1 6/2022 Sato
2022/0171303 A1 6/2022 Hiramatsu
2022/0365457 A1 11/2022 Unno
2023/0015518 A1 1/2023 Nozaki
2023/0037779 A1 2/2023 Suzumura

FOREIGN PATENT DOCUMENTS

CN 106959594 A 7/2017
JP 2003-262978 A 9/2003
JP 2004-309517 A 11/2004
JP 2005-17660 A 1/2005
JP 2007-86458 A 4/2007
JP 2007-140368 A 6/2007
JP 2007-292981 A 11/2007
JP 2009-42386 A 2/2009
JP 2010-26185 A 2/2010
JP 2011-39382 A 2/2011
JP 2014-139618 A 7/2014
JP 2017-54001 A 3/2017
JP 2019-12158 A 1/2019
JP 2020-091327 A * 6/2020 ............... G03G 9/09
JP 2020-144273 A 9/2020
KR 10-2010-0098786 A 9/2010

OTHER PUBLICATIONS

Machine translation, JP2020-091327A, Kobori (Year: 2025).*
SYLYSIA Industrial Use, Synthetic Silica Specialist Company Fuji Silysia Chemical.
Spherical silica “SANSIL TM” Advanced Materials Business Division | Products | Tokuyama pp. 1-4.
Spherical-Silica Fine Particles QSG Series | Shinetsu pp. 1-2.
Quarch et al., Mechanical fragmentation of precipitated silica aggregates, Chem. Eng. Res. Des., vol. 88, Iss. 12 (2010) 1639-47.

* cited by examiner

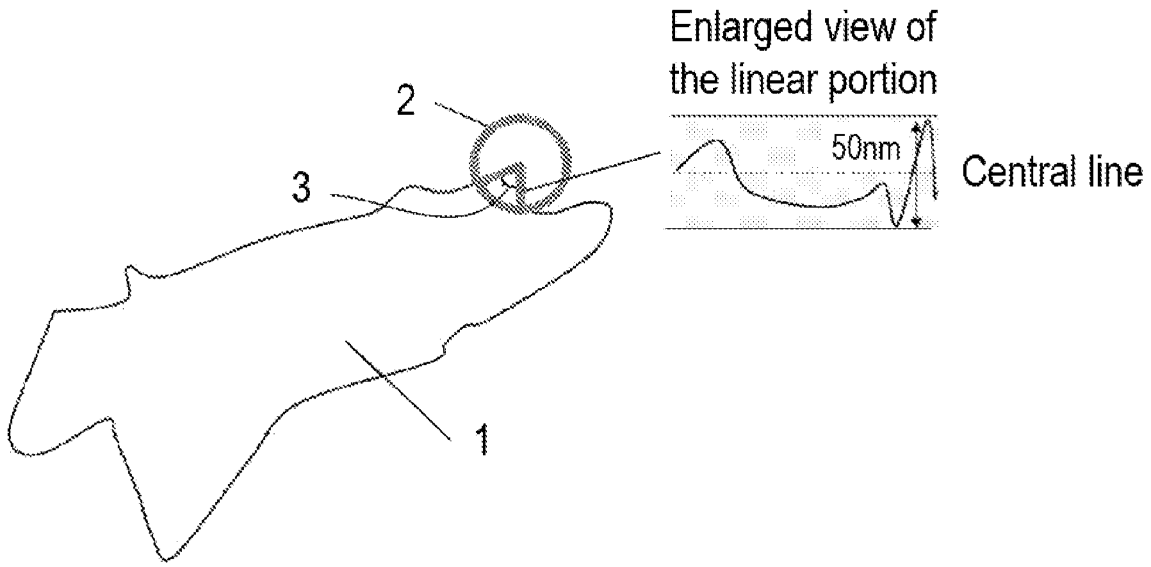
Enlarged view of the linear portion
2
3
50nm
Central line
1

TONER

BACKGROUND OF THE INVENTION

Field of the Invention

The present disclosure relates to a toner to be used in a recording method using an electrophotographic method or the like.

Description of the Related Art

In recent years, the purpose of use and environment of use of image forming apparatuses such as copiers and printers have diversified, and demand has been created for higher speed, higher image quality, and higher stability. Further, at the same time, in copiers and printers, the miniaturization and energy saving of the apparatuses are progressing, and a magnetic one-component developing system using a magnetic toner, which is advantageous in these respects, is preferably used.

The electrophotographic method involves a charging step of charging an electrostatic latent image carrier (hereinafter referred to as a photosensitive member) by a charging means, an exposure step of exposing the charged photosensitive member to form an electrostatic latent image, and a developing step of developing the electrostatic latent image with a toner to form a toner image. Next, a transfer step of transferring the toner image to a recording material with or without an intermediate transfer member, and a fixing step of passing the recording material bearing the toner image through a nip portion formed by a pressurizing member and a rotatable image heating member, thereby heating, pressurizing and fixing the toner image, are performed to output an image.

In order to meet the demand for energy saving created in recent years and adapt to use in a wide variety of environments, in addition to sufficient fixing at a low temperature, it is important that storage stability be higher than the conventional one. Many techniques have been disclosed regarding the improvement of fixing performance, and among them, there are many disclosures related to plasticizers such as hydrocarbon waxes, ester waxes, and crystalline polyesters.

However, the storage stability is often lowered by the addition of a plasticizer, and physical properties of a toner are likely to fluctuate because the plasticizer repeatedly melts and precipitates, especially in an environment where the temperature rises and falls repeatedly such as in heat cycling. Specifically, a phenomenon such as the plasticizer out-migrating to the toner surface and becoming more compatible with the resin may occur, which can affect the charging performance and flowability of the toner and further manifest itself as development streaks and density unevenness. Furthermore, since the resin viscosity is lowered by the addition of a plasticizer, the hot offset property is likely to be lowered.

In order to cope with this problem, Japanese Patent Application Publication No. 2010-026185 has heretofore attempted to improve storage stability by internally adding fatty acid amide-treated silica as a crystal nucleating agent.

Further, Japanese Patent Application Publication No. 2009-042386 discloses a technique for improving filming resistance by including pearl necklace-type silica in a core particle. Further, Japanese Patent Application Publication No. 2004-309517 also discloses a technique for improving low-temperature fixability and productivity by adding inorganic fine particles at the time of melt-kneading.

SUMMARY OF THE INVENTION

However, it was found that the techniques disclosed in the above documents are not sufficient from the viewpoint of storage stability in a heat cycle environment. The present disclosure provides a toner having excellent low-temperature fixability and excellent storage stability in a heat cycle environment.

The present disclosure relates to a toner comprising a toner particle comprising a binder resin, a crystalline material, and a silica particle, wherein a number average particle diameter D1 of the silica particle comprised in the toner particle is 400 to 3000 nm;

the silica particle has a pointed portion; and the crystalline material comprises a compound having an ester group.

According to the present disclosure, it is possible to provide a toner having excellent low-temperature fixability and excellent storage stability in a heat cycle environment. Further features of the present invention will become apparent from the following description of exemplary embodiments with reference to the attached drawings.

BRIEF DESCRIPTION OF THE DRAWINGS

FIG. 1 illustrates a pointed portion.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily.

The present disclosure relates to a toner comprising a toner particle comprising a binder resin, a crystalline material, and a silica particle, wherein a number average particle diameter D1 of the silica particle comprised in the toner particle is 400 to 3000 nm;

the silica particle has a pointed portion; and the crystalline material comprises a compound having an ester group.

The toner comprises a compound having an ester group (hereinafter, also referred to as an ester compound) as a crystalline material. Generally, a crystalline material having an ester group as described above has high compatibility with the binder resin. For example, as compared with a hydrocarbon wax, such ester compound can be bent starting from the ester group, and therefore has high motility and excellent plasticity with respect to the binder resin, thereby being particularly effective for improving low-temperature fixability.

Meanwhile, where a crystalline material having an ester group is simply used, the storage stability is often lowered. This is apparently because the molecular motion starts from a relatively low temperature below the melting point due to the high motility caused by the ester group as described above, and a part of the crystalline material starts to melt. Further, where the temperature changes from a high temperature to a low temperature, the melted ester compound crystallizes. Therefore, where the high temperature and the low temperature are repeated, the melting and crystallization are repeated, and the position at which the crystalline material is present inside the binder resin may change gradually. As a result, the ester compound may move and out-migrate to the toner surface, thereby changing the charging performance and developing performance of the toner.

Such a phenomenon becomes remarkable in a heat cycle environment where the temperature changes greatly and the temperature rises and falls repeatedly. The present inventors conducted diligent studies to improve the storage stability in a heat cycle environment of a toner in which a crystalline material having an ester group is used and which has excellent fixing performance. As a result, it was found that the storage stability can be significantly improved by using a silica particle with a relatively large particle diameter that has a pointed portion.

The toner will be described below. The abovementioned "a silica particle" is contained in the toner particle (as an internal additive) and refer to those internally added to the binder resin in the toner production step. That is, the silica particle is mixed with the binder resin in the toner production step, and when a toner is obtained, the silica particle is in a state of being internally added to the toner particle. For example, the silica particle is dispersed in the binder resin. Hereinafter, the silica particle comprised in the toner particle are also referred to as internally added silica particle. Further, in the present disclosure, the silica particle refers to particles having silicon dioxide as a main component, and the main component refers to a component constituting 80% by mass or more of the silica particles. According to the studies of silica particle conducted by the present inventors, for example, the use of a composite compound such as talc as a silica-containing compound did not produce the effect of the present application. This was apparently due to a low ratio of silicon dioxide in talc, and it was considered that it is important to use a silica particle having a high component ratio of silicon dioxide as described above. The crystalline material refers to a material having an endothermic peak when measured according to ASTM D3418-82 using a differential scanning calorimeter (for example, "Q1000" (manufactured by TA Instruments As described above, in a heat cycle environment, a crystalline material having an ester group goes back and forth between a dissolved state and a crystalline state. According to the studies conducted by the present inventors, it was found that the internally added silica particle having a pointed portion acts as a crystal nucleating agent for an ester compound, and remarkable maintenance of the crystalline state of the ester compound is exhibited.

The consideration given to this issue by the present inventors will be described hereinbelow. First, the state of an ester compound at the time of toner production will be described by taking as an example a case including a melt kneading step. Where the binder resin and the ester compound are melt-kneaded at a temperature equal to or higher than the melting point of the ester compound, the ester compound is in a state of being compatible with the binder resin. Where a silica particle having a pointed portion is present in the binder resin at that time, it is conceivable that the movement of the ester compound will be disturbed at the pointed portion, so that the density distribution of the ester compound will be disturbed. In the light of the nucleation theory, where there is a non-uniform state, nucleation is likely to occur therefrom, and it is conceivable that the same phenomenon occurs in toners and that the formation of a crystal nucleus is likely to occur due to the pointed portion.

Further, according to the study conducted by the present inventors, it is conceivable that since the silica particle having a pointed portion act to promote the crystallization of the ester compound, rapid crystal formation of the ester compound occurs at the pointed portion, and a large number of ester compounds in a crystalline state are present.

Next, exposure to a heat cycle environment will be considered. As the temperature rises, the crystals of the ester compound present at the pointed portion start molecular motion as described above and try to be compatible with the binder resin. However, it is conceivable that nucleation occurs causing recrystallization immediately after melting due to the promoting crystallization effect of pointed portions of silica particle. Therefore, it is conceivable that the crystals can be prevented from becoming compatible with the binder resin and further out-migrating to the toner surface.

The pointed portion of the internally added silica particle refers to a site where the angle shown in FIG. 1 is 90 degrees or less in the cross-sectional observation of the toner. An internally added silica particle having a pointed portion refers to a silica particle having one or more sites having an angle of 90 degrees or less. A specific method for determining whether the silica particle has a pointed portion will be described hereinbelow. In the cross-sectional observation of the toner with a transmission electron microscope, the number of pointed portions in the internally added silica particle is preferably from 1 to 50, and more preferably from 1 to 20 per one internally added silica particle.

A toner particle comprising a silica particle having a pointed portion refers to a case in which in cross-sectional observation of the toner particle with a transmission electron microscope, a proportion of the number of cross sections of the toner particles comprising the internally added silica particle having a pointed portion to the number of observed cross sections of the toner particles is 70% by number or more. In cross-sectional observation of the toner particle with a transmission electron microscope, the proportion (% by number) of the number of cross sections of the toner particle including the silica particle having a pointed portion to the number of observed cross sections of the toner particles is preferably 80% by number or more, more preferably 90% by number or more, and even more preferably 93% by number or more. The upper limit is not particularly limited but is preferably, for example, 100% by number or less and 99% by number or less.

Further, in the cross-sectional observation of the toner particle with a transmission electron microscope, the number of a silica particle having a pointed portion is preferably from 1.0 to 30.0 per one cross section of the toner particle, more preferably from 1.0 to 20.0, and even more preferably from 1.0 to 10.0.

The internally added silica particle may be surface-treated. From the viewpoint of storage stability in a heat cycle environment, it is preferable that the particles be not surface-treated with a fatty acid amide.

The number average diameter (D1) of the internally added silica particle is from 400 nm to 3000 nm. Within the above range, storage stability is enhanced without inhibiting the fixing process. The D1 of the internally added silica particle is preferably from 600 nm to 2500 nm, and more preferably from 1000 nm to 2000 nm.

The amount of the internally added silica particle contained in the toner particle is preferably 0.1 part by mass or more, more preferably 0.5 part by mass or more, even more preferably 0.9 mass by mass or more, and still more preferably 1.5 part by mass or more with respect to 100 parts by mass of the binder resin. Meanwhile, the upper limit is preferably 10.0 parts by mass or less, more preferably 8.0 parts by mass or less, even more preferably 5.0 parts by mass or less, still more preferably 3.0 parts by mass or less, and most preferably 2.5 parts by mass or less.

The particles internally added to the toner particle need to be silica. According to the studies conducted by the present inventors, since silica acts to promote the crystallization of the ester compound, the above effect can be obtained by providing silica with a pointed portion. Other inorganic oxides such as alumina and titania demonstrate no effect, and the above problem cannot be solved.

In order to enhance the above effect, it is also preferable to control the amount ratio of the compound having an ester group, which is a crystalline material, and the internally added silica particle. Specifically, the value of the mass-based ratio of the amount of the compound having an ester group in the toner particle to the amount of the internally added silica particle comprised in the toner particle (silica particle/ester compound) is preferably from 1.0 to 20.0, more preferably from 2.0 to 11.0, and even more preferably from 2.5 to 5.0. Within this range, the effect of the internally added silica particle crystallizing the crystalline material having an ester group is more sufficiently exhibited.

A method for producing the internally added silica particle is not particularly limited, and a known method can be adopted. A method for producing internally added silica particle can be exemplified by a vapor phase method in which a silicon compound such as metallic silicon, a silicon halide, and a silane compound is reacted in a gas phase, and a wet method in which a silane compound such as an alkoxysilane is hydrolyzed and condensed. The production method can be selected without restriction, provided that the internally added silica particle have a pointed portion. In the production of the relatively large silica particle having a diameter of from 400 nm to 3000 nm, a vapor phase oxidation method in which a powder raw material is directly oxidized by a chemical flame consisting of oxygen and hydrogen is preferably used. The vapor phase oxidation method is a preferable production method for obtaining a large silica particle because the temperature inside of the reaction vessel can be instantaneously raised to the melting point of the inorganic fine powder or a higher temperature.

As the internally added silica particle, for example, the silica particle having a size of about from 3000 nm to 5000 nm can be produced by the abovementioned vapor phase oxidation method and pulverized by a known method to obtain the internally added silica particle having a pointed portion. For example, where a device having a high pulverizing ability such as a pulverizer or a jet mill is used as a pulverizing machine, it is easy to control the shape and the particle diameter. Further, the particle size distribution can be adjusted, as appropriate, by using a known classification device.

In particular, in order to form a pointed portion at a silica particle, it is preferable to have a pulverization step in the production of the silica particle. According to the study conducted by the present inventors, it is difficult to form a pointed portion by a usual method producing fumed silica or sol-gel silica.

The internally added silica particle preferably comprises $SiO_2$ in an amount of from 80% by mass to 100% by mass, more preferably from 90% by mass to 100% by mass, still more preferably from 95% by mass to 100% by mass, and even more preferably from 98% by mass to 100% by mass.

The toner particle may comprise a colorant. The colorant is not particularly limited to known pigments and magnetic bodies. The toner particle preferably comprises a magnetic body as a colorant. Further, the colorant preferably comprises a magnetic body as a main component. As a result, the entire toner can be made rigid, and the developing performance tends to be improved. "Comprising a magnetic body as a main component" means that the content ratio of the magnetic body in the colorant is from 50% by mass to 100% by mass, preferably from 80% by mass to 100% by mass, and more preferably from 90% by mass to 100% by mass.

The magnetic bodies can be exemplified by iron oxides such as magnetite, maghemite, ferrite, and the like; metals such as iron, cobalt, and nickel; alloys of these metals with a metal such as aluminum, copper, magnesium, tin, zinc, beryllium, calcium, manganese, selenium, and titanium, tungsten, and vanadium, and mixtures thereof.

The shape of the magnetic body can be an octahedron, a hexahedron, a sphere, a needle, a flake, and the like, and any of these can be used, but a polyhedron having four or more faces is preferable, and a polyhedron having eight or more faces is more preferable.

The number average particle diameter (D1) of primary particles of the magnetic bodies is preferably from 100 nm to 350 nm, more preferably from 100 nm to 300 nm, and further preferably from 110 nm to 300 nm.

A method for producing magnetic iron oxide particles as magnetic bodies is not particularly limited, and for example, the following method can be used for production. An aqueous solution including ferrous hydroxide is prepared by adding an alkali such as sodium hydroxide to a ferrous salt aqueous solution in an amount at least equivalent to an iron component. Air is blown while maintaining the pH of the prepared aqueous solution at pH 7 or higher, and the oxidation reaction of ferrous hydroxide is carried out while heating the aqueous solution to 70° C. or higher to first generate seed crystals each forming the core of the magnetic iron oxide particle.

Next, an aqueous solution including ferrous sulfate in an amount about 1 equivalent based on the amount of alkali added before is added to the slurry-like liquid including seed crystals. While maintaining the pH of the liquid at from 5 to 10, the reaction of ferrous hydroxide is promoted while blowing air, and magnetic iron oxide is grown around the seed crystals. At this time, it is possible to control the shape and magnetic properties of the magnetic iron oxide particles by selecting an arbitrary pH, reaction temperature, and stirring conditions and adding an additive as necessary. As the oxidation reaction progresses, the pH of the liquid shifts to the acidic side, but it is preferable that the pH of the liquid be not less than 5. Magnetic iron oxide particles can be obtained by filtering, washing and drying the magnetic iron oxide particles, which have been thus obtained, by conventional methods.

The amount of the magnetic bodies is preferably from 50 parts by mass to 150 parts by mass, and more preferably from 60 parts by mass to 120 parts by mass with respect to 100 parts by mass of the binder resin.

Further, where the ratio between the number average particle diameter of the internally added silica particle and the number average diameter of the magnetic bodies is adjusted, the above effect can be more easily obtained. Specifically, the silica particle comprised in the toner particle has the number average particle diameter D1 of preferably two times or more, more preferably three times or more, still more preferably five times or more a number average particle diameter of the magnetic bodies. Further, the ratio is preferably 20 or less, more preferably 15 or less, and further preferably 11 or less.

The toner includes a binder resin. The binder resin is not particularly limited, and known materials such as vinyl-based resins, polyester-based resins, and the like can be used.

Specifically, styrene-based copolymers such as polystyrene, styrene-propylene copolymer, styrene-vinyl toluene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-octyl methacrylate copolymer, styrene-butadiene copolymer, styrene-isoprene copolymer, styrene-maleic acid copolymer, styrene-maleic acid ester copolymers, and the like, polyacrylic acid esters, polymethacrylic acid esters, polyvinyl acetate, and the like may be used, and these can be used alone or in combination of two or more.

Examples of polymerizable monomers of vinyl-based resins include the following.

Styrene-based monomers such as styrene, o-methylstyrene, m-methylstyrene, p-methylstyrene, p-methoxystyrene, p-ethylstyrene, and the like; acrylic acid esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chlorethyl acrylate, phenyl acrylate, and the like; methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, and the like; other monomers such as acrylonitrile, methacrylonitrile, acrylamide, and the like. These monomers may be used alone or in a mixture.

The binder resin is preferably an amorphous resin. As the binder resin, a styrene-based copolymer and a polyester resin are preferable in terms of development characteristics, fixing performance, and the like. The polyester resin is preferably an amorphous polyester resin. The binder resin more preferably includes a styrene acrylic resin. The styrene acrylic resin is preferable from the viewpoint of suppressing development streaks after exposure to a heat cycle environment. The styrene acrylic resin is preferably a copolymer of styrene with at least one selected from the group consisting of acrylic acid esters and methacrylic acid esters.

As the amorphous polyester resin, a usual one composed of an alcohol component and an acid component can be used, and the two components are exemplified below.

Examples of the dihydric alcohol component include ethylene glycol, propylene glycol, 1,3-butanediol, 1,4-butanediol, 2,3-butanediol, diethylene glycol, triethylene glycol, 1,5-pentanediol, 1, 6-hexanediol, neopentyl glycol, 2-ethyl-1,3-hexanediol, cyclohexanedimethanol, butenediol, octenediol, cyclohexenedimethanol, hydrogenated bisphenol A, or bisphenol derivatives represented by a formula (A); hydrogenation products of compounds represented by the formula (A), diols represented by a formula (B), or diols that are hydrogenation products of the compounds of the formula (B).

(A)

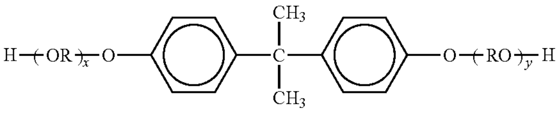

In the formula, R is an ethylene group or a propylene group, x and y are integers of 1 or more, and the average value of x+y is from 2 to 10.

(B)

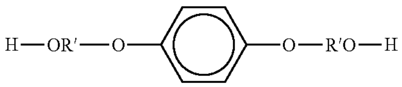

(In formula, R' is 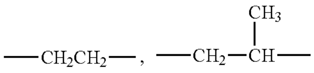 or 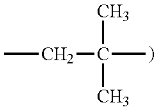 )

Examples of the divalent acid component include benzenedicarboxylic acids such as phthalic acid, terephthalic acid, isophthalic acid, and phthalic anhydride or anhydrides thereof; alkyldicarboxylic acids such as succinic acid, adipic acid, sebacic acid, and azelaic acid or anhydrides thereof; succinic acid substituted with an alkyl or alkenyl group having from 6 to 18 carbon atoms or anhydrides thereof; and unsaturated dicarboxylic acids such as fumaric acid, maleic acid, citraconic acid, and itaconic acid or anhydrides thereof.

Further, examples of the trihydric or higher alcohol component include glycerin, pentaerythritol, sorbit, sorbitan, and an oxyalkylene ether of a novolak type phenol resin, and examples of the trivalent or higher acid component include trimellitic acid, pyromellitic acid, 1,2,3,4-butanetetracarboxylic acid, benzophenonetetracarboxylic acids, and anhydrides thereof.

A charge control agent may be added to the toner. As charge control agents for negative charging, organometallic complexes and chelate compounds are effective, and examples thereof include a monoazo metal complexes; acetylacetone metal complexes; metal complexes of aromatic hydroxycarboxylic acids or aromatic dicarboxylic acids, and the like. Specific examples of commercially available products include Spilon Black TRH, T-77, and T-95 (Hodogaya Chemical Co., Ltd.), BONTRON (registered trademark) S-34, S-44, S-54, E-84, E-88, and E-89 (Orient Chemical Co., Ltd.).

The toner particle comprises a crystalline material, and the crystalline material comprises a compound having an ester group. The compound having an ester group refers to a compound having one or more ester groups in one molecule. Examples thereof include ester waxes such as behenic behenate and behenic stearate, and crystalline polyesters which are condensates of a diol and a dicarboxylic acid.

From the viewpoint of low-temperature fixability, the melting point of the compound having an ester group is preferably 60° C. or higher, and more preferably 63° C. or higher. The melting point is preferably 150° C. or lower, more preferably 115° C. or lower, still more preferably 85° C. or lower, and even more preferably 80° C. or lower.

Known ester waxes can be used. Specifically, natural waxes such as montan wax and derivatives thereof, carnauba wax, candelilla wax, and the like, and waxes including a fatty acid ester as a main component can be used. At least one selected from the group consisting of fatty acid ester waxes and carnauba wax, and more preferably at least one selected from the group consisting of monofunctional fatty acid ester waxes is preferable. The "wax including a fatty acid ester as a main component" refers to a wax having the content ratio of a fatty acid ester of from 50% by mass to 100% by mass, preferably from 80% by mass to 100% by mass, and more preferably from 90% by mass to 100% by mass.

The peak molecular weight of the ester wax is preferably 2000 or less, more preferably 1500 or less, and even more preferably 1000 or less. The lower limit is not particularly limited, but is preferably 200 or more, and more preferably 400 or more.

As the compound having an ester group, a wax including a fatty acid ester as a main component (hereinafter referred to as an aliphatic ester wax) is preferable. The following are preferred aliphatic ester waxes. The functional number indicates the number of ester groups contained in one molecule. For example, behenyl behenate is called a monofunctional ester wax, and dipentaerythritol hexabehenate is called a hexafunctional ester wax.

As the monofunctional aliphatic ester wax, a condensate of a monocarboxylic acid having from 4 to 28 carbon atoms and a monoalcohol having from 4 to 28 carbon atoms can be used. For example, at least one selected from the group consisting of stearyl stearate, behenyl stearate, stearyl behenate, and behenyl behenate is preferable, and at least one selected from the group consisting of behenyl behenate and behenyl stearate is more preferable.

As the bifunctional aliphatic ester wax, a condensate of a dicarboxylic acid and a monoalcohol or a condensate of a diol and a monocarboxylic acid can be used.

Examples of the dicarboxylic acid include adipic acid, pimelic acid, suberic acid, azelaic acid, sebacic acid, and dodecanedioic acid.

Examples of the diol include 1,6-hexanediol, 1,7-heptanediol, 1,8-octanediol, 1,9-nonanediol, 1,10-decanediol, 1,11-undecanediol, and 1,12-dodecanediol.

As the monoalcohol to be condensed with a dicarboxylic acid, an aliphatic alcohol is preferable. Specific examples thereof include tetradecanol, pentadecanol, hexadecanol, heptadecanol, octadecanol, nonadecanol, eicosanol, docosanol, tricosanol, tetracosanol, pentacosanol, hexacosanol, octacosanol, and the like. Among these, docosanol is preferable from the viewpoint of fixing performance and developing performance.

Examples of the monocarboxylic acid to be condensed with a diol include lauric acid, myristic acid, palmitic acid, margaric acid, stearic acid, tuberculostearic acid, arachidic acid, behenic acid, lignoceric acid, cerotic acid, and the like. Among these, behenic acid is preferable from the viewpoint of fixing performance and developing performance.

Although linear fatty acids and linear alcohols have been exemplified herein, those having a branched structure may be also used.

Ester waxes that are trifunctional or higher functional can also be used. Here, examples of trifunctional or higher functional aliphatic ester waxes will be given.

Examples of trifunctional ester waxes include condensates of glycerin compounds and monofunctional aliphatic carboxylic acids. Examples of tetrafunctional ester waxes include condensates of pentaerythritol and monofunctional aliphatic carboxylic acids, and condensates of diglycerin and aliphatic carboxylic acids. Examples of pentafunctional ester waxes include condensates of triglycerin and monofunctional aliphatic carboxylic acids. Examples of hexafunctional ester waxes include condensates of dipentaerythritol and monofunctional aliphatic carboxylic acids, and condensates of tetraglycerin and monofunctional aliphatic carboxylic acids.

Next, the crystalline polyester will be specifically described. A crystalline polyester can be selected without particular limitation as long as it has a crystalline structure. It is preferable to use a condensate of an aliphatic diol and an aliphatic dicarboxylic acid for the crystalline polyester because excellent plasticizing ability is demonstrated during crystallization in the binder resin and fixing. It is preferable that the aliphatic diol and the aliphatic dicarboxylic acid have from 4 to 16 carbon atoms because fixing performance and storage stability are likely to be balanced.

The weight average molecular weight of the crystalline polyester is preferably from 10,000 to 50,000, and more preferably from 10,000 to 40,000.

As the crystalline polyester, one manufactured by a known synthetic method can be used. For example, the crystalline polyester can be obtained by conducting an esterification reaction or a transesterification reaction of a dicarboxylic acid component and a diol component, and then conducting a polycondensation reaction by a conventional method under reduced pressure or by introducing nitrogen gas.

At the time of esterification or transesterification reaction, a usual esterification catalyst or a transesterification catalyst such as sulfuric acid, tertiary butyl titanium butoxide, dibutyltin oxide, manganese acetate, magnesium acetate, or the like can be used, if necessary. For polymerization, ordinary polymerization catalysts such as tertiary butyl titanium butoxide, dibutyl tin oxide, tin acetate, zinc acetate, tin disulfide, antimony trioxide, germanium dioxide, and the like can be used. The polymerization temperature and the amount of catalyst are not particularly limited, and may be arbitrarily selected as needed.

The amount of the compound having an ester group in the toner is preferably from 1.0 part by mass to 40.0 parts by mass, more preferably from 3.0 parts by mass to 35.0 parts by mass, even more preferably from 3.0 parts by mass to 20.0 parts by mass, and further preferably from 5.0 parts by mass to 10.0 parts by mass or less with respect to 100 parts by mass of the binder resin.

If necessary, a crystalline material such as a hydrocarbon wax may be further compounded in the toner in order to improve the fixing performance. As the release agent, all known release agents can be used. Specific examples include petroleum waxes such as paraffin wax, microcrystalline wax, petrolactam and derivatives thereof, hydrocarbon waxes obtained by the Fischer-Tropsch method and derivatives thereof, polyolefin waxes represented by polyethylene and polypropylene and derivatives thereof, and the like.

The toner may comprise a toner particle and an external additive on a surface of the toner particle. A known external additive can be used.

Examples of the external additive include an inorganic fine particle (a metal oxide fine particles) such as a silica fine particle, an alumina fine particle, a titania fine particle, a zinc oxide fine particle, a strontium titanate fine particle, a cerium oxide fine particle, and a calcium carbonate fine particle.

Other additives, for example, a lubricant powder such as fluororesin powder, zinc stearate powder, polyvinylidene fluoride powder and the like; an abrasive such as cerium oxide powder, silicon carbide powder, strontium titanate powder, and the like; a flowability-providing agent, for example, titanium oxide powder, aluminum oxide powder, and the like; an anti-caking agent; or organic fine particles and inorganic fine particles having opposite polarities as developing performance improvers can be used in the toner in small amounts within the ranges in which no substantial adverse effect is produced. It is also possible to subject the surface of these additives to hydrophobization treatment before use.

The weight average particle diameter (D4) of the toner is preferably from 3.0 μm to 12.0 μm, and more preferably from 4.0 μm to 10.0 μm. Where the weight average particle diameter (D4) is in the above range, good flowability can be obtained and the latent image can be faithfully developed.

A method for producing the toner is not particularly limited, and a known production method can be adopted. Examples of the method for producing the toner include a pulverization method and a polymerization method, for example, a dispersion polymerization method, an associative aggregation method, a dissolution suspension method, a suspension polymerization method, and an emulsion polymerization and aggregation method.

Hereinafter, a pulverization method for producing the toner through a melt-kneading step and a pulverization step is specifically exemplified, but the present invention is not limited thereto.

For example, a binder resin, a crystalline material and a silica particle, and if necessary, a colorant, a release agent, a charge control agent and other additives are sufficiently mixed with a mixer such as a Henschel mixer or a ball mill (mixing step). The obtained mixture is melt-kneaded using a heat kneader such as a twin-screw kneading extruder, heating rolls, a kneader, and an extruder (melt-kneading step).

After the obtained melt-kneaded product is cooled and solidified, it is pulverized (pulverization step) using a pulverizer and classified (classification step) using a classifier to obtain toner particles. The toner particles may be used as toner as they are. If necessary, the toner particles and an external additive may be mixed with a mixer such as a Henschel mixer to obtain a toner.

Examples of the mixer include the following. FM Mixer (Nippon Coke Industries Co., Ltd.); Super Mixer (Kawata Mfg. Co., Ltd.); RIBOCONE (Okawara Mfg. Co., Ltd.); NAUTA MIXER, TURBULIZER, Cyclomix (Hosokawa Micron Corporation); Spiral Pin Mixer (Pacific Machinery & Engineering Co., Ltd.); and Loedige Mixer (manufactured by Matsubo Corporation).

Examples of the heat kneader include the following. KRC Kneader (manufactured by Kurimoto, Ltd.); Buss Co-kneader (manufactured by Buss AG); TEM type extruder (manufactured by Toshiba Machine Co., Ltd.); TEX twin-screw kneader (manufactured by The Japan Steel Works, Ltd.); PCM kneader (manufactured by Ikegai Corp.); there-roll mill, mixing roll mill, kneader (Inoue Mfg., Inc.); Kneadex (Mitsui Mining Co., Ltd.); MS type pressurization kneader, KNEADER-RUDER (Moriyama KK); Banbury mixer (KOBELCO).

Examples of the pulverizer include the following. Counter Jet Mill, Mikro Jet, INOMIZER (manufactured by Hosokawa Micron Corporation); IDS type mill, PJM Jet Pulverizer (manufactured by Nippon Pneumatic Mfg. Co., Ltd.); Cross Jet Mill (manufactured by Kurimoto, Ltd.); ULLMAX (manufactured by Nippon Soda Co., Ltd.); SK Jet-O Mill (manufactured by Seishin Enterprise Co., Ltd.); CRYPTRON (manufactured by Kawasaki Heavy Industries Co., Ltd.); Turbo Mill (manufactured by Turbo Industries, Ltd.); Super Rotor (manufactured by Nisshin Engineering Co., Ltd.).

Examples of classifiers are presented below. Classifier, Micron Classifier, Spedic Classifier (manufactured by Seishin Enterprise Co., Ltd); Turbo Classifier (manufactured by Nisshin Engineering Co., Ltd.); Mikron Separator, Turboplex (ATP), TSP Separator (manufactured by Hosokawa Micron Corporation); Elbow Jet (Nittetsu Mining Co., Ltd.), Dispersion Separator (manufactured by Nippon Pneumatic Mfg. Co., Ltd.); YM Microcut (manufactured by Yasukawa Corporation).

Further, the following sieving devices may be used to screen the coarse particles. ULTRASONIC (manufactured by Kouei-Sangyo Co., Ltd.); RESONASIEVER, Gyro Shifter (manufactured by Tokuju Co., Ltd.); VIBRA SONIC SYSTEM (manufactured by Dalton Corporation); SONICLEAN (manufactured by Sintokogio, Ltd.); Turbo Screener (manufactured by Turbo Industries, Ltd.); MICROSIFTER (manufactured by Makino Mfg. Co., Ltd.); circular vibration sieve.

Next, methods for measuring each physical property will be described.

Method for Measuring Number Average Particle Diameter of Internally Added Silica Particles and Magnetic Bodies The internally added silica particle refers to the silica particle comprised in the toner particle preceding an external addition step. Whether the particle is silica particle can be confirmed by an energy dispersive X-ray analyzer (EDX). The number average particle diameter of the internally added silica particle means the number average value of the major axes of the internally added silica particle based on the cross-sectional image of the toner particles observed with a transmission electron microscope (TEM). An image of a cross section of toner particles obtained with a transmission electron microscope (TEM) is prepared as follows.

Using an osmium plasma coater (Filgen, Inc., OPC80T), an Os film (5 nm) and a naphthalene film (20 nm) are applied to the toner as a protective film, and the toner is encapsulated with a photocurable resin D800 (JEOL Ltd.). Then, a toner particle cross section having a film thickness of 60 nm (or 70 nm) is produced with an ultrasonic ultramicrotome (Leica, UC7) at a cutting speed of 1 mm/s.

STEM observation is performed on the obtained cross section by using a STEM function of a TEM (JEOL Ltd., JEM2800). The STEM probe size is 1 nm, and the acquired image size is 1024×1024 pixels. From the cross section of the toner particles, a cross section having a diameter of 0.9 to 1.1 times the weight average particle diameter is selected.

For the obtained image, the major axes of the internally added silica particle are determined using the image processing software "Image-Pro Plus ver. 4.0 (manufactured by Media Cybernetics, Inc.)". In calculating the number average diameter, the cross section of 100 toner particles is observed. The presence or absence of the internally added silica particle having a diameter of from 400 nm to 3000 nm is determined, and the obtained number average value is defined as the number average particle diameter D1 of the internally added silica particle.

Further, in the image in which the silica particle are observed, the angle of the end portion is calculated using the image processing software "Image-Pro Plus ver. 4.0 (manufactured by Media Cybernetics, Inc.)". Specifically, as shown in FIG. 1, the end portion of a silica particle 1 is detected by the Edge Detector of the software.

A circle with a radius of 200 nm (the circle indicated by 2 in the FIGURE) centered on the detected end portion is drawn. Two straight lines connecting the end portion with the intersections of the circle and the contour of the silica particle are drawn, and lines with a width of 50 nm that are centered on the straight lines (in the FIGURE, two lines extending from the center of the circle 2 to the contour of the circle 2) are drawn. The contour line of the silica particle 1 contained in the two lines having a width of 50 nm is shown as the "enlarged view of the linear portion" in the FIGURE. Here, where the contour line of the silica particle does not fit in the width of 50 nm, the end portion thereof is not analyzed. The angle formed by the two lines having a width of 50 nm (3 in the FIGURE) is analyzed by the software, and when the angle is 90 degrees or less, it is determined that the silica particle has a pointed portion.

The cross sections of 100 toner particles are observed, the number of pointed portions per silica particle, the number of the silica particle having a pointed portion for one cross section of the toner particle, and the percentage of the number of toner particles comprising a silica particle having a pointed portion in the number of observed cross sections of the toner particles are calculated.

Regarding the number average particle diameter of the magnetic bodies, as in the case of the silica particle, the number average value of major axes of the magnetic bodies in the cross-sectional observation of 100 toner particles is taken to obtain the number average particle diameter of the magnetic bodies. The magnetic bodies may also be distinguished by an energy dispersive X-ray analyzer (EDX).

Method for Measuring Melting Point of Compound Having Ester Group

The melting point of the compound having an ester group as a crystalline material is measured according to ASTM D3418-82 using a differential scanning calorimeter "Q1000" (manufactured by TA Instruments). The melting points of indium and zinc are used for temperature correction of the device detector, and the heat of fusion of indium is used for the correction of calorific value.

Specifically, 10 mg of a compound having an ester group is precisely weighed, placed in an aluminum pan, an empty aluminum pan is used as a reference, and the measurement is performed at a temperature rise rate of 10° C./min in the measurement temperature range of from 30° C. to 200° C. In the measurement, the temperature is once raised to 200° C., then lowered to 30° C. at 10° C./min, and then raised again at 10° C./min. The peak temperature of the endothermic peak is obtained from the DSC curve in the temperature range of from 30° C. to 200° C. in the second temperature raising process. The peak temperature of the endothermic peak is taken as the melting point.

Measurement of Weight Average Particle Diameter (D4) and Number Average Particle Diameter (D1) of Toner (Particles)

A precision particle size distribution analyzer "Coulter Counter Multisizer 3" (registered trade name, manufactured by Beckman Coulter, Inc.) based on a pore electrical resistance method and equipped with an aperture tube having a diameter of 100 and dedicated software Beckman Coulter Multisizer 3 Version 3.51" (manufactured by Beckman Coulter, Inc.) for setting measurement conditions and analyzing measurement data are used to measure the weight average particle diameter (D4) and the number average particle diameter (D1) of the toner (particles) with 25,000 effective measurement channels, and the measurement data are analyzed and calculated.

As the electrolytic aqueous solution to be used for the measurement, special grade sodium chloride dissolved in ion exchanged water so that the concentration becomes about 1% by mass, for example, "ISOTON II" (manufactured by Beckman Coulter, Inc.), can be used.

The following settings are performed on the dedicated software prior to measurement and analysis.

On the "Change standard measurement method (SOM)" screen of the dedicated software, the total count number in the control mode is set to 50,000 particles, the number of measurements to 1, and the Kd value to a value obtained with "Standard particles 10.0 μm" (manufactured by Beckman Coulter, Inc.). The threshold and noise level are set automatically by pushing the "Threshold/noise level measurement" button. The current is set to 1600 μA, the gain to 2, and the electrolytic solution to ISOTON II, and a check is entered for "Aperture tube flush after measurement".

On the "Settings for conversion from pulse to particle diameter" screen of the dedicated software, the bin interval is set to the logarithmic particle diameter, the particle diameter bin to 256, and the particle diameter range to from 2 μm to 60 μm.

The specific measurement method is as follows.

(1) About 200 ml of the aqueous electrolytic solution is added to a dedicated glass 250 ml round-bottomed beaker of the Multisizer 3, the beaker is set on the sample stand, and stirring is performed counter-clockwise with a stirrer rod at a rate of 24 rps. Contamination and bubbles in the aperture tube are then removed by the "Aperture flush" function of the dedicated software.

(2) Approximately 30 ml of the aqueous electrolytic solution is placed in a glass 100 ml flat-bottomed beaker, and about 0.3 ml of a diluted solution of "Contaminon N" (a 10% by mass aqueous solution of a neutral detergent for washing precision instruments that includes a nonionic surfactant, an anionic surfactant, and an organic builder and has pH 7, manufactured by Wako Pure Chemical Industries, Ltd.) diluted 3-fold by mass with ion exchange water is added.

(3) The prescribed amount of ion exchange water is added to the water tank of an ultrasonic disperser "Ultrasonic Dispersion System Tetora 150 (product name)" (Nikkaki Bios Co., Ltd.) with an electrical output of 120 W that is equipped with two built-in oscillators having an oscillating frequency of 50 kHz with their phases shifted by 180 degree from each other, and about 2 ml of the Contaminon N is added to the tank.

(4) The beaker of (2) above is set in the beaker-fixing hole of the ultrasonic disperser, and the ultrasonic disperser is operated. The height position of the beaker is adjusted so as to maximize the resonant state of the liquid surface of the aqueous electrolytic solution in the beaker.

(5) In a state where the electrolytic aqueous solution in the beaker of (4) above is irradiated with ultrasonic waves, about 10 mg of toner (particles) is added little by little to the electrolytic aqueous solution and dispersed. Then, the ultrasonic dispersion processing is continued for another 60 sec. For ultrasonic dispersion, the water temperature in the water tank is adjusted, as appropriate, to from 10° C. to 40° C.

(6) The aqueous electrolytic solution of (5) above with the toner (particles) dispersed therein is dropped with a pipette into the round-bottomed beaker of (1) above installed on a sample stand to adjust to a measurement concentration of about 5%. Measurement is then performed until the number of measured particles reaches 50,000.

(7) The measurement data is analyzed with the dedicated software provided with the device, and the weight average particle diameter (D4) is calculated. The weight average particle diameter (D4) is the "Average diameter" on the "Analysis/volume statistical value (arithmetic mean)" screen when graph/% by volume is set in the dedicated software, and the number average particle diameter (D1) is the "Average diameter" on the "Analysis/number statistical value (arithmetic mean)" screen when graph/% by number is set in the dedicated software.

Composition Analysis of Binder Resin

Separation Method of Binder Resin

A total of 100 mg of the toner is dissolved in 3 ml of chloroform. Next, the insoluble matter is removed by suction filtration with a syringe equipped with a sample processing filter (pore size from 0.2 μm to 0.5 μm, for example, Myshori Disk H-25-2 (manufactured by Tosoh Corporation) is used). The soluble component is introduced into a prep HPLC (equipment: LC-9130 NEXT, manufactured by Japan Analytical Industry Co., Ltd., prep column [60 cm], 2 connected with exclusion limits: 20000, 70000) and the chloroform eluate is delivered. Where a peak can be confirmed on the obtained chromatograph display, the retention time at which the molecular weight becomes 2000 or more is separated with a monodisperse polystyrene standard sample. The solution of the obtained fraction is dried and solidified to obtain a binder resin.

Identification of Components of Binder Resin and Measurement of Weight Ratio by Nuclear Magnetic Resonance Spectroscopy (NMR)

A total of 1 mL of deuterated chloroform is added to 20 mg of toner and the NMR spectrum of the protons of the dissolved binder resin is measured. The molar ratio and mass ratio of each monomer can be calculated from the obtained NMR spectrum, and the amount of constituent monomer units of the binder resin such as styrene-acrylic resin can be obtained. For example, in the case of a styrene-acrylic copolymer, the composition ratio and mass ratio can be calculated based on the peak near 6.5 ppm derived from the styrene monomer and the peak 3.5 to 4.0 ppm derived from the acrylic monomer. Further, in the case of a copolymer of a polyester resin and a styrene-acrylic resin, the molar ratio and the weight ratio are calculated with a combination of the peaks derived from each monomer constituting the polyester resin and the peaks derived from the styrene-acrylic copolymer, and the amount of the monomer unit of the polyester resin is determined.

NMR device: JEOL RESONANCE ECX500
Observation nucleus: proton
Measurement mode: single pulse
Reference peak: TMS Measurement of Weight Average Molecular Weight Mw, Number Average Molecular Weight Mn, and Peak Molecular Weight The molecular weight distributions (weight average molecular weight Mw, number average molecular weight Mn, peak molecular weight) of crystalline materials and resins are measured by gel permeation chromatography (GPC) in the following manner.

First, a sample is dissolved in tetrahydrofuran (THF) at room temperature for 24 h. Then, the obtained solution is filtered through a solvent-resistant membrane filter “Myshori Disk” (manufactured by Tosoh Corporation) having a pore diameter of 0.2 μm to obtain a sample solution. The sample solution is adjusted so that the concentration of the component soluble in THF is 0.8% by mass. This sample solution is used for measurement under the following conditions.

Device: HLC8120GPC (detector: RI) (manufactured by Tosoh Corporation)
Column: 7 sets of Shodex KF-801, 802, 803, 804, 805, 806, and 807 (manufactured by Showa Denko K.K.)
Eluent: tetrahydrofuran (THF)
Flow velocity: 1.0 ml/min
Oven temperature: 40.0° C.
Sample injection amount: 0.10 ml In calculating the molecular weight of the sample, standard polystyrene resins (for example, trade name “TSK standard polystyrene F-850, F-450, F-288, F-128, F-80, F-40, F-20, F-10, F-4, F-2, F-1, A-5000, A-2500, A-1000, and A-500”, manufactured by Tosoh Corporation) are used.

EXAMPLE

Hereinafter, the present invention will be described in more detail with reference to Production Examples and Examples, but the present invention is not limited thereto. The number of parts in the following formulations indicates parts by mass.

Production Example of Silica Particles 1

A mixed gas having a volume ratio of argon and oxygen of 3:1 was introduced into a reaction vessel to replace the atmosphere therein. Oxygen gas at 40 ($m^3$/hr) and hydrogen gas at 20 ($m^3$/hr) were supplied into this reaction vessel, and a combustion flame composed of oxygen and hydrogen was formed using an ignition device. Next, metallic silicon powder was charged as a raw material into the combustion flame with a hydrogen carrier gas having a pressure of 147 kPa (1.5 kg/$cm^2$) to form a dust cloud. This dust cloud was ignited by a combustion flame, and an oxidation reaction due to a dust explosion was initiated. After the oxidation reaction, the inside of the reaction vessel was cooled to obtain silica powder having a number average particle diameter of 2.67 μm.

By pulverizing this silica powder with a pulverizer (manufactured by Hosokawa Micron Corporation), silica particle 1 having a number average particle diameter of 1520 nm were obtained.

Production Examples of Silica Particles 2 to 4, 6, and 8

Silica particles 2 to 4, 6, and 8 were obtained as in the production example of silica particle 1 by pulverizing while adjusting the pulverization strength of the pulverizer.

Production Examples of Silica Particles 5, 7 and 9

A mixed gas having a volume ratio of argon and oxygen of 3:1 was introduced into a reaction vessel to replace the atmosphere therein. Oxygen gas at 40 ($m^3$/hr) and hydrogen gas at 20 ($m^3$/hr) were supplied into this reaction vessel, and a combustion flame composed of oxygen and hydrogen was formed using an ignition device. Next, metallic silicon powder was charged as a raw material into the combustion flame with a hydrogen carrier gas having a pressure of 0.5 kg/cm' to form a dust cloud. This dust cloud was ignited by a combustion flame, and an oxidation reaction due to a dust explosion was initiated. After the oxidation reaction, the inside of the reaction vessel was cooled to obtain silica powder having a number average particle diameter of 3.44 μm.

This silica powder was pulverized with a pulverizer, to obtain silica particle 5 and 7. A powder that was not pulverized with the pulverizer was used as silica particle 9.

Table 1 shows the silica particle. Silica particles RY200 manufactured by Nippon Aerosil Co., Ltd. were used as silica particle 10.

TABLE 1

| | Pointed portion | Number average particle diameter (D1) |
|---|---|---|
| Silica particle 1 | Yes | 1520 nm |
| Silica particle 2 | Yes | 1010 nm |

TABLE 1-continued

| | Pointed portion | Number average particle diameter (D1) |
|---|---|---|
| Silica particle 3 | Yes | 2030 nm |
| Silica particle 4 | Yes | 610 nm |
| Silica particle 5 | Yes | 2480 nm |
| Silica particle 6 | Yes | 410 nm |
| Silica particle 7 | Yes | 2930 nm |
| Silica particle 8 | Yes | 250 nm |
| Silica particle 9 | No | 3440 nm |
| Silica particle 10 | No | 12 nm |

Production Example of Magnetic Material 1

A caustic soda solution at 1.00 to 1.10 equivalent with respect to iron element, $P_2O_5$ in an amount such as to obtain 0.15% by mass of phosphorus element with respect to iron element, and $SiO_2$ in an amount to obtain 0.50% by mass of silicon element with respect to iron element were mixed with a ferrous sulfate aqueous solution to prepare an aqueous solution including ferrous hydroxide. The pH of the aqueous solution was set to 8.0, and an oxidation reaction was carried out at 85° C. while blowing air to prepare a slurry liquid having seed crystals.

Next, a ferrous sulfate aqueous solution was added to this slurry liquid to obtain a 0.90 to 1.20 equivalent with respect to the initial amount of alkali (sodium component of caustic soda), and then the slurry liquid was maintained at pH 7.6, and an oxidation reaction was promoted while blowing air to obtain a slurry liquid including iron oxide. The generated magnetic iron oxide particles were filtered with a filter press, washed with a large amount of water, and dried at 120° C. for 2 h, and the obtained particles were pulverized to obtain magnetic bodies 1 having a number average particle diameter of 150 nm. The magnetic bodies 1 had an octahedral shape.

Production Examples of Magnetic Bodies 2 to 4

Magnetic bodies 2 to 4 shown in Table 2 were obtained as in the production example of magnetic bodies 1 by conducting the oxidation reaction at 85° C. and adjusting the holding time to pH 7.6. The magnetic bodies 2 to 4 had an octahedral shape.

TABLE 2

| | Number average particle diameter (D1) |
|---|---|
| Magnetic bodies 1 | 150 nm |
| Magnetic bodies 2 | 102 nm |
| Magnetic bodies 3 | 299 nm |
| Magnetic bodies 4 | 310 nm |

Compound Having Ester Group

In the examples described hereinbelow, materials shown in Table 3 were used as the compound having an ester group, which is a crystalline material.

TABLE 3

| | Name | Melting point (° C.) |
|---|---|---|
| Ester compound 1 | Behenyl behenate | 75 |
| Ester compound 2 | Behenyl stearate | 65 |
| Ester compound 3 | Carnauba wax | 83 |
| Ester compound 4 | Pentaerythritol tetrastearate | 79 |
| Ester compound 5 | Crystalline polyester; condensate of sebacic acid and dodecanediol | 76 |
| Ester compound 6 | Crystalline polyester; condensate of fumaric acid and hexanediol | 113 |

Weight average molecular weight of ester compound 5:41,000

Weight average molecular weight of ester compound 6:25,000

Production Example of Toner 1

Binder resin A: 100.0 parts (Styrene acrylic resin having a mass ratio of styrene and n-butyl acrylate of 78:22; Mw=8500, Tg=58° C.)

Behenyl behenate (melting point 75° C.): 7.0 parts

Silica particles 1:2.0 parts

Iron complex of monoazo dye (T-77 manufactured by Hodogaya Chemical Co., Ltd.): 2.0 parts Magnetic bodies 1:100 parts The above materials were mixed using a Henschel mixer (FM-75 type, manufactured by Mitsui Mining Co., Ltd.) at a rotation speed of 20 s' and a rotation time of 5 min, and then kneaded with a twin-screw kneader (PCM-30, manufactured by Ikegai Corp.) set at a temperature of 130° C. The obtained kneaded product was cooled to 25° C. and coarsely pulverized to 1 mm or less with a hammer mill to obtain a coarsely pulverized product. The obtained coarsely pulverized product was finely pulverized with a mechanical pulverizer (T-250, manufactured by Turbo Industries, Ltd., Ltd.). Toner particles 1 having a weight average particle diameter (D4) of 8.4 μm were obtained by classifying using a multi-division classifier utilizing the Coanda effect.

A total of 1.5 parts of a hydrophobically treated silica particle as an external additive having a number average particle diameter of primary particles of 10 nm was mixed with 100 parts of the obtained toner particles for 5 min under the condition of a rotation speed of 3000 rpm of a Henschel mixer (manufactured by Mitsui Mining Co., Ltd.) to obtain a toner mixture.

Then, coarse particles were removed using a sieve of 300 mesh (opening 48 μm) to obtain a toner 1. The weight average particle diameter of the toner 1 was 8.4 μm. Table 4 shows the formulation and physical properties of the toner 1.

TABLE 4

| Toner No. | Magnetic bodies | Binder resin | Silica particle species | Silica particle/ Parts | Ester compounds | Ester compounds No. | Ester compounds/ Parts | X (Number) | Y (% by number) |
|---|---|---|---|---|---|---|---|---|---|
| 1 | Magnetic bodies 1 | Binder resin A | Silica particle 1 | 2.0 | Behenyl behenate | 1 | 7.0 | 2.8 | 95 |
| 2 | Magnetic bodies 2 | Binder resin A | Silica particle 1 | 2.0 | Behenyl stearate | 2 | 7.0 | 2.7 | 95 |
| 3 | Magnetic bodies 3 | Binder resin A | Silica particle 1 | 2.0 | Carnauba wax | 3 | 7.0 | 2.7 | 94 |
| 4 | Magnetic bodies 3 | Binder resin A | Silica particle 1 | 2.0 | Pentaerythritol tetrastearate | 4 | 7.0 | 2.8 | 96 |
| 5 | Magnetic bodies 4 | Binder resin A | Silica particle 1 | 2.0 | Crystalline polyester | 5 | 7.0 | 2.9 | 95 |
| 6 | Magnetic bodies 4 | Binder resin B | Silica particle 1 | 2.0 | Crystalline polyester | 5 | 7.0 | 2.8 | 94 |
| 7 | Magnetic bodies 4 | Binder resin B | Silica particle 1 | 2.0 | Crystalline polyester | 5 | 3.0 | 2.6 | 96 |
| 8 | Magnetic bodies 4 | Binder resin B | Silica particle 1 | 2.0 | Crystalline polyester | 5 | 20.0 | 2.7 | 95 |
| 9 | Magnetic bodies 4 | Binder resin B | Silica particle 1 | 2.0 | Crystalline polyester | 5 | 25.0 | 2.9 | 96 |
| 10 | Magnetic bodies 4 | Binder resin B | Silica particle 1 | 5.0 | Crystalline polyester | 5 | 25.0 | 8.1 | 95 |
| 11 | Magnetic bodies 4 | Binder resin B | Silica particle 1 | 1.0 | Crystalline polyester | 5 | 25.0 | 1.9 | 95 |
| 12 | Magnetic bodies 4 | Binder resin B | Silica particle 2 | 1.0 | Crystalline polyester | 5 | 25.0 | 3.3 | 95 |
| 13 | Magnetic bodies 4 | Binder resin B | Silica particle 3 | 1.0 | Crystalline polyester | 5 | 25.0 | 2.8 | 92 |
| 14 | Magnetic bodies 4 | Binder resin B | Silica particle 4 | 1.0 | Crystalline polyester | 5 | 25.0 | 6.2 | 98 |
| 15 | Magnetic bodies 4 | Binder resin B | Silica particle 5 | 1.0 | Crystalline polyester | 5 | 25.0 | 1.5 | 93 |
| 16 | Magnetic bodies 4 | Binder resin B | Silica particle 6 | 1.0 | Crystalline polyester | 5 | 25.0 | 18.0 | 99 |
| 17 | Magnetic bodies 4 | Binder resin B | Silica particle 7 | 1.0 | Crystalline polyester | 6 | 25.0 | 1.1 | 90 |
| 18 | Magnetic bodies 1 | Binder resin A | Silica particle 1 | — | Behenyl behenate | 1 | 7.0 | 0.0 | 0 |
| 19 | Magnetic bodies 1 | Binder resin A | Silica particle 1 | 2.0 | HNP-9 | HNP-9 | 7.0 | 2.8 | 95 |
| 20 | Magnetic bodies 1 | Binder resin A | Silica particle 8 | 2.0 | Behenyl behenate | 1 | 7.0 | 35.3 | 99 |
| 21 | Magnetic bodies 1 | Binder resin A | Silica particle 9 | 2.0 | Behenyl behenate | 1 | 7.0 | 0.0 | 0 |
| 22 | Magnetic bodies 3 | Binder resin A | Silica particle 10 | 2.0 | Carnauba wax | 3 | 7.0 | 0.0 | 0 |

In the table, X (number) indicates the number of the silica particle having a pointed portion in one cross section of the toner particle. Y (% by number) indicates the proportion (% by number) of the toner particles comprising the internally added silica particle having a pointed portion in the number of observed cross sections of the toner particles.

Production Examples of Toners 2 to 5

Toners 2 to 5 were obtained in the same manner as in the production example of toner 1, except that the materials shown in Table 4 were used. The formulations and physical characteristics are shown in Table 4.

Production Examples of Toner 6

Toner 6 was obtained in the same manner as in the production example of toner 5, except that the binder resin A was changed to the following binder resin B. The formulation and physical characteristics are shown in Table 4.

Binder resin B: composition (mol %) [polyoxypropylene (2.2)-2,2-bis(4-hydroxyphenyl)propane:polyoxyethylene (2.2)-2,2-bis(4-hydroxyphenyl)propane:terephthalicacid: trimellitic acid=80:20:85:15], Mw=152,000]

Production Examples of Toners 7 to 17

Toners 7 to 17 were obtained in the same manner as in the production example of toner 6, except that the materials shown in Table 4 were used. The formulations and physical characteristics are shown in Table 4.

COMPARISON EXAMPLES

Production Examples of Toners 18 to 22

Toners 18 to 22 were obtained in the same manner as in the production example of toner 1, except that the materials shown in Table 4 were used. The formulations and physical characteristics are shown in Table 4. HNP-9 is a paraffin wax (manufactured by Nippon Seiro Co., Ltd.). In the obtained toners 1 to 22, the number average particle diameter of the silica particle observed under a transmission electron microscope was the same as that of the added silica particle.

Evaluation of Rubbing Fixability

The HP LaserJet Enterprise M609dn was modified to a process speed of 500 mm/sec in consideration of the fixing performance evaluation on a high-speed machine, and the fixing temperature control was lowered by 25° C. from the setting to evaluate fixing performance under rubbing.

For the evaluation of fixing performance under rubbing, a solid black image was output in a normal-temperature and normal-humidity environment and the evaluation was performed by the degree of stain on the Silbon paper (manufactured by Nikon Corp.) before and after rubbing. The paper used was OCE RED LABEL (basis weight: 80 g/$m^2$).

The fixed image was evaluated by the density of stains on the Silbon paper after rubbing 10 times back and forth with the Silbon paper (manufactured by Nikon Corp.) under a load of 100 g/$cm^2$. The staining was evaluated using a Macbeth reflection densitometer (manufactured by Macbeth) by the numerical value of the difference in density between the pre-use and the stained portion, and A to C were determined to be good. The evaluation results are shown in Table 5.

A: difference in density is from 0 to 0.02

B: difference in density is from 0.03 to 0.05

C: difference in density is from 0.06 to 0.09

D: difference in density is 0.10 or more

Evaluation of Storage Stability in High-Temperature Environment

A total of 10 g of toner was put in a 100 ml glass bottle and allowed to stand in a thermostat at a temperature of 50° C. for 24 h. After that, the toner was subjected to a screening operation for 1 min with a 400 mesh ultrasonic screen and then checked for the presence of aggregated toner and evaluated according to the following criteria.

The evaluation results are shown in Table 5.

A: no lumps can be seen

B: there are some lumps, but they readily collapse when touched

C: there are lumps that do not collapse when touched

Evaluation of Storage Stability in Heat Cycle Environment

The toner was placed in a resin cup and allowed to stand under the conditions described in the heat cycle environment section hereinbelow. After that, three solid black images were continuously output in the same manner as in the evaluation of fixing performance under rubbing. When the crystalline material having an ester group out-migrates due to heat cycling, the charging performance of the toner may change or the flowability may decrease.

As an index for observing the change in the charging performance, the density unevenness in the solid black image was evaluated. The density unevenness was evaluated as the difference between the maximum value and the minimum value of the density in the solid black image, and the first one of the three solid black images was used. As an index related to flowability, the development streaks were visually evaluated. Since the development streaks are often reduced as the output continues, all three solid black images were viewed and evaluated including whether the images could be restored. The image density was measured using a Macbeth reflection densitometer (manufactured by Macbeth). The evaluation results are shown in Table 5.

Heat Cycle Environment

The evaluation under a heat cycle environment was performed using a thermostat with controllable temperature and humidity. The heat cycle evaluation method differs from the aforementioned evaluation of storage stability in a high-temperature environment in that the temperature and humidity are assumed to change significantly and repeatedly.

The heat cycle environment was set to the following conditions.

1. After allowing to stay continuously in the following environment A for 12 h, the environment was changed from A to B over 2 h. At that time, the temperature was controlled to change linearly.

2. After allowing to stay continuously in the environment B for 2 h, the environment was changed from B to A over 2 h.

The control of 1 and 2 above was repeated 40 times. The evaluation results are shown in Table 5.

Environment A; temperature 25° C., humidity 50%

Environment B; temperature 50° C., humidity 50%

Indexes of Density Unevenness

A: difference in density is 0.02 or less

B: difference in density is from 0.03 to 0.04

C: difference in density is from 0.05 to 0.06

D: difference in density is from 0.07 to 0.08

E: difference in density is from 0.09 or more

Indexes of Development Streaks

A: no streaks in all images

B: slight streak-like density unevenness is observed in one image

C: slight streak-like density unevenness is observed in two out of three images

D: slight streak-like density unevenness is observed in all three images

E: white streaks can be seen on one or more images

Examples 1 to 17, Comparative Examples 1 to 5

The above evaluation was performed using toners 1 to 17 as Examples 1 to 17 and toners 18 to 22 as Comparative Examples 1 to 5. The results are shown in Table 5.

TABLE 5

| | | Density unevenness after heat cycling | Development streaks after heat cycling | Evaluation to storage stability in high-temperature environment | Evaluation of fixing performance under rubbing |
|---|---|---|---|---|---|
| Example 1 | Toner 1 | A | A | A | A |
| Example 2 | Toner 2 | A | A | A | A |
| Example 3 | Toner 3 | A | A | A | B |
| Example 4 | Toner 4 | A | A | A | B |
| Example 5 | Toner 5 | B | A | A | A |
| Example 6 | Toner 6 | B | B | A | A |
| Example 7 | Toner 7 | B | B | A | B |
| Example 8 | Toner 8 | B | B | A | A |
| Example 9 | Toner 9 | B | C | A | A |
| Example 10 | Toner 10 | B | C | A | A |
| Example 11 | Toner 11 | C | C | A | A |
| Example 12 | Toner 12 | C | C | A | A |
| Example 13 | Toner 13 | D | C | A | A |
| Example 14 | Toner 14 | D | D | A | A |
| Example 15 | Toner 15 | D | D | A | A |
| Example 16 | Toner 16 | D | D | B | A |
| Example 17 | Toner 17 | D | D | B | A |
| Comparative Example 1 | Toner 18 | E | E | C | A |
| Comparative Example 2 | Toner 19 | C | C | A | D |
| Comparative Example 3 | Toner 20 | D | E | C | D |
| Comparative Example 4 | Toner 21 | E | E | C | A |
| Comparative Example 5 | Toner 22 | E | E | C | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-110925, filed Jul. 2, 2021, which is hereby incorporated by reference herein in its entirety.

What is claimed is:

1. A toner, comprising:

a toner particle comprising a binder resin, a crystalline material and a silica particle;

the silica particle being present within the toner particle, and a number average particle diameter D1 of the silica particle within the toner particle being 400 to 3000 nm, wherein the silica particle has a pointed portion, and the crystalline material comprises a compound having an ester group.

2. The toner according to claim 1, wherein the toner particle further comprises a colorant, and the colorant comprises a magnetic body as a main component.

3. The toner according to claim 2, wherein D1 is 2 to 20 times a number average particle diameter of the magnetic bodies.

4. The toner according to claim 1, wherein the compound having the ester group has a melting point of 60 to 150° C.

5. The toner according to claim 1, wherein the binder resin is a styrene acrylic resin.

6. The toner according to claim 1, wherein the compound having the ester group is an ester wax.

7. The toner according to claim 1, wherein the amount of the silica particle comprised in the toner particle is 0.1 to 10.0 parts by mass with respect to 100 parts by mass of the binder resin.

8. The toner according to claim 1, wherein a value of a mass-based ratio of the amount of the compound having the ester group in the toner particle to the amount of the silica particle comprised in the toner particle is 1.0 to 20.0.

9. The toner according to claim 1, wherein in cross-sectional observation of the toner particle with a transmission electron microscope, a proportion of the number of cross sections of the toner particles comprising the silica particle having the pointed portion to the number of observed cross sections of the toner particles is 90% by number or more.

10. The toner according to claim 1, wherein the amount of the compound having the ester group is 3.0 to 20.0 parts by mass with respect to 100 parts by mass of the binder resin.

11. The toner according to claim 1, wherein the toner further comprises a silica particle as an external additive on a surface of the toner particle other than the silica particle comprised in the toner particle.

12. The toner according to claim 1, wherein a number of the silica particle having the pointed portion is 1.0 to 30.0 per cross section of the toner particle in cross-sectional observation with a transmission electron microscope.

* * * * *